United States Patent
Cuiffo (10) Patent No.: US 11,856,078 B2
(45) Date of Patent: Dec. 26, 2023

(54) LOCAL COMMON OBJECT REQUEST BROKER ARCHITECTURE JUMPER

(71) Applicant: BAE Systems Information and Electronic Systems Integration Inc., Nashua, NH (US)

(72) Inventor: George A. Cuiffo, Edison, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 55 days.

(21) Appl. No.: 17/672,244

(22) Filed: Feb. 15, 2022

(65) Prior Publication Data

US 2023/0262147 A1    Aug. 17, 2023

(51) Int. Cl.
*H04L 69/08* (2022.01)
*G06F 9/54* (2006.01)

(52) U.S. Cl.
CPC .............. *H04L 69/08* (2013.01); *G06F 9/547* (2013.01)

(58) Field of Classification Search
CPC .................................. H04L 69/08; G06F 9/547
USPC .......................................................... 709/246
See application file for complete search history.

(56) References Cited

U.S. PATENT DOCUMENTS

| | | | | |
|---|---|---|---|---|
| 7,269,664 B2* | 9/2007 | Hutsch | .................... | H04L 67/34 707/999.1 |
| 7,331,049 B1* | 2/2008 | Jin | ....................... | G06Q 10/107 709/201 |
| 7,954,108 B2* | 5/2011 | Paniscotti | ............... | G06F 9/541 719/330 |
| 2007/0220020 A1* | 9/2007 | Goto | .................... | G06F 16/2452 |

OTHER PUBLICATIONS

Hadatko, Embedded RPC v1.4, released Mar. 28, 2017, github.com/EmbeddedRPC (8 pages) (Year: 2017).*

* cited by examiner

*Primary Examiner* — Wing F Chan
*Assistant Examiner* — Leon Y Tseng
(74) *Attorney, Agent, or Firm* — Sand, Sebolt & Wernow LPA; Scott J. Asmus (57) ABSTRACT

A custom transport jumper utilizing local Common Object Request Broker Architecture protocols to intercept message data before the data is marshalled into a CDR package. The custom transport jumper may then utilize the Common Object Request Broker Architecture standard to allow communication between systems on different operating systems, in different programming languages, and/or on different computing hardware while allowing messages to be sent in a more efficient, more portable, and more easily policed manner.

18 Claims, 3 Drawing Sheets

LOCAL COMMON OBJECT REQUEST BROKER ARCHITECTURE JUMPER

TECHNICAL FIELD

The present disclosure relates generally to the field of network communications. More particularly, in one example, the present disclosure relates to Common Object Request Broker Architecture (CORBA®) network communications and remote procedure calling. Specifically, in another example, the present disclosure relates to an embedded remote procedure call jumper for use with CORBA network communications.

BACKGROUND

Common Object Request Broker Architecture (CORBA®) is a messaging standard designed to facilitate communication between systems utilizing different operating systems, program languages, and/or computing hardware. Generally speaking, CORBA enables communication between software written in different languages and running on different computers. CORBA further normalizes method call semantics between application objects utilizing an all-encompassing messaging structure, which marshals messages into common data representation (CDR) format.

CORBA distributes objects across networks allowing any language with a CORBA binding to be used to call and implement remote CORBA objects described in an interface definition language (IDL).

When utilized in secure embedded systems, CORBA presents a challenge for overhead and policing messages between processors. This not only introduces latency into the system but is also difficult to secure or guard by parsing and verifying CORBA messages. In particular, while CORBA has the ability to provide custom transports for networking calls, however these custom transports generally introduce two issues contributing to the difficulty in guarding the data by parsing and verifying the CORBA messages. Specifically, the first issue is that networking calls and messages have already been marshalled by the CORBA system by the time they reach the custom transport. Second, there is no standard on the transport layer so custom transports are not portable between object request brokers (ORBs).

Software communications architecture (SCA) is an architecture framework defining a standard way for radios to instantiate, configure, advantage waveform applications running on their platforms. The SCA defines a framework to connect a CORBA client to a CORBA server (known as a uses port and provides port in the SCA, respectively). Current systems within the SCA defined framework utilize CORBA in a manner that a client makes a CORBA call as defined in the IDL from a remote server for a particular object. The object is then marshalled into a CDR and sent to the remote client, which then requires the client to reverse the marshalling before the object can be accessed and the data may be extracted therefrom. As mentioned above, once the data in the object has been marshalled, it is difficult to parse and verify CORBA messages, thus making it likewise difficult to secure communications and/or makes the CORBA based application not portable between orbs.

SUMMARY

The present disclosure addresses these and other issues by providing a custom transport jumper utilizing local CORBA protocols to intercept message data before the data is marshalled into a CDR package. The custom transport jumper may then utilize the CORBA standard to allow communication between systems on different operating systems, in different programming languages, and/or on different computing hardware while allowing messages to be sent in a more efficient, more portable, and more easily policed manner.

In one aspect, an exemplary embodiment of the present disclosure may provide a method of network communications comprising: generating a Common Object Request Broker Architecture (CORBA) framework based remote procedure call (RPC) request from a client; intercepting the RPC request with an embedded remote procedure call (ERPC) jumper; and directing data in the RPC request from the client to a remote server via an ERPC transport; wherein the RPC request is intercepted from the client before the data therein is marshalled by the CORBA framework. This exemplary embodiment or another exemplary embodiment may further provide receiving the data in the RPC request from the ERPC jumper at the remote server; and directing the data in the RPC request from the ERPC jumper to the remote server. This exemplary embodiment or another exemplary embodiment may further provide marshalling the data in the RPC request with the ERPC jumper prior to directing the data via the ERPC transport. This exemplary embodiment or another exemplary embodiment may further provide unmarshalling the data in the RPC request with the ERPC jumper prior to directing the data in the RPC request from the ERPC jumper to the server. This exemplary embodiment or another exemplary embodiment may further provide wherein intercepting the RPC request further comprises: sending the RPC from a client uses port; and receiving the RPC request with an ERPC provides port within a shared memory region as the client uses port. This exemplary embodiment or another exemplary embodiment may further provide wherein receiving the RPC request with an ERPC provides port within a shared memory region as the client uses port appears as a local CORBA based RPC request. This exemplary embodiment or another exemplary embodiment may further provide wherein directing the data from the ERPC jumper to the server further comprises: sending the RPC from an ERPC uses port; and receiving the RPC request with a server provides port within a shared memory region as the ERPC uses port. This exemplary embodiment or another exemplary embodiment may further provide wherein receiving the RPC request with a server provides port within a shared memory region as the ERPC uses port appears as a local CORBA based RPC request. This exemplary embodiment or another exemplary embodiment may further provide wherein generating a CORBA framework based RPC request further comprises: generating a software communications architecture CORBA framework based RPC request.

In another aspect, an exemplary embodiment of the present disclosure may provide a non-transitory computer readable storage medium having instructions encoded thereon, that when executed by at least one processor, implement operations to intercept a remote procedure call (RPC) in a Common Object Request Broker Architecture (CORBA) framework system, the instructions including: generate a Common Object Request Broker Architecture (CORBA) framework based remote procedure call (RPC) request from a client; intercept the RPC request with an embedded remote procedure call (ERPC) jumper before the data therein is marshalled by the CORBA framework; and direct the data in the RPC request from the ERPC jumper to the remote server.

This exemplary embodiment or another exemplary embodiment may further provide wherein the instructions further comprise: receive the data in the RPC request from the ERPC jumper at the remote server; and direct the data in the RPC request from the ERPC jumper to the remote server. This exemplary embodiment or another exemplary embodiment may further provide wherein the instructions further comprise: marshal the data in the RPC request with the ERPC jumper prior to directing the data via the ERPC transport. This exemplary embodiment or another exemplary embodiment may further provide wherein the instructions further comprise: unmarshall the data in the RPC request with the ERPC jumper prior to directing the data in the RPC request from the ERPC jumper to the server. This exemplary embodiment or another exemplary embodiment may further provide wherein intercepting the RPC request further comprises: sending the RPC from a client uses port; and receiving the RPC request with an ERPC provides port within a shared memory region as the client uses port. This exemplary embodiment or another exemplary embodiment may further provide wherein receiving the RPC request with an ERPC provides port within a shared memory region as the client uses port appears as a local CORBA based RPC request. This exemplary embodiment or another exemplary embodiment may further provide wherein directing the data from the ERPC jumper to the server further comprises: sending the RPC from an ERPC uses port; and receiving the RPC request with a server provides port within a shared memory region as the ERPC uses port. This exemplary embodiment or another exemplary embodiment may further provide wherein receiving the RPC request with a server provides port within a shared memory region as the ERPC uses port appears as a local CORBA based RPC request. This exemplary embodiment or another exemplary embodiment may further provide wherein generating a CORBA framework based RPC request further comprises: generating a software communications architecture CORBA framework based RPC request.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Communication systems utilizing Common Object Request Broker Architecture enables communications between other systems running on other computers regardless of the specific operating system, programming language, and/or hardware platforms used thereby. CORBA permits these mixed form communications by normalizing the method call semantics between systems and between application objects in both local and remote address spaces. Generally speaking, CORBA utilizes interface definition language (IDL) and an all-encompassing messaging structure to marshal data communications into common data representation (CDR) format. While beneficial in allowing communication between non-identical systems, the data marshalling into CDR packages standard in CORBA communications introduces issues regarding efficiency and security in such communications. Additionally, the conversion of object request/call data in to CDR introduces a substantial amount of overhead into that data.

Where CORBA communications have a higher need for security, such as in embedded systems, and/or where CORBA messaging systems are utilized in secure messaging platforms, the increased latency and lack of standards on the transport layer can further introduce security risks in utilizing CORBA-based communications.

Commonly, military communications utilizing embedded communications systems on a software communications architecture (SCA) framework require high levels of monitoring and security to prevent sensitive communications from being disseminated or otherwise made available to persons other than the intended recipient(s). Current SCA framework utilizes CORBA to allow communications across non-identical platforms; however, these communications are less secure and the data messages are difficult to guard by parsing and verifying by parsing and verification.

Figure 1:
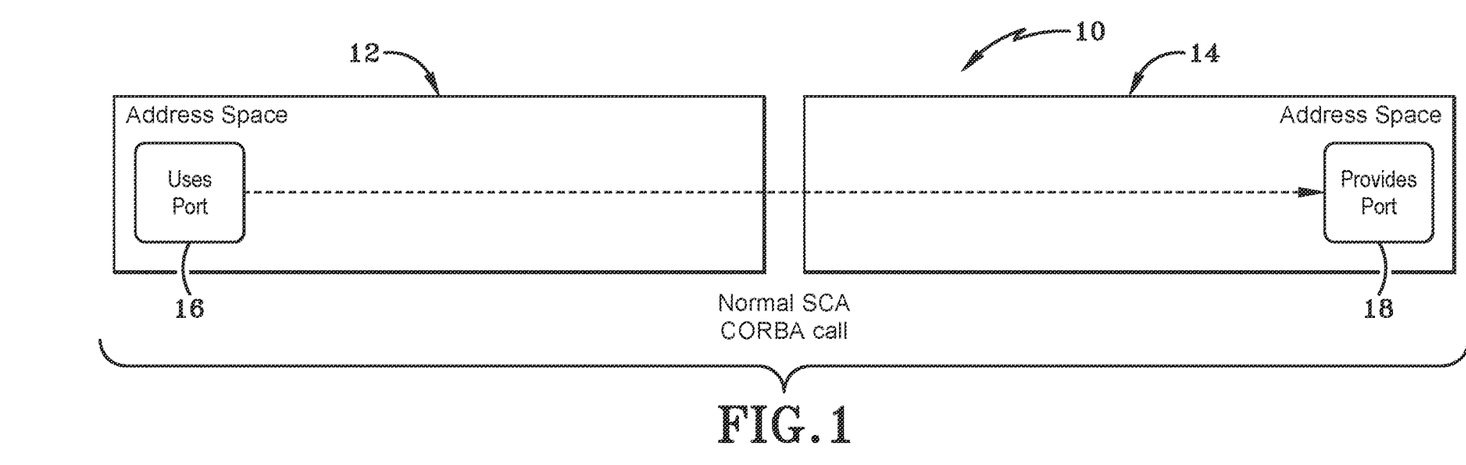
FIG. 1 (FIG. 1) is a block diagram representation of a software communications architecture (SCA) Common Object Request Broker Architecture call without implementation of a custom transport jumper according to one aspect of the present disclosure.

With reference now to FIG. 1, a current SCA-defined framework connecting a CORBA client to a CORBA server is shown and will now be described. In particular, FIG. 1 depicts a current or "normal" SCA CORBA port connection indicated generally as CORBA system shown at reference 10. This normal SCA CORBA system 10 may generally include a CORBA client indicated at reference 12 and a CORBA server indicated at reference 14. As used herein and discussed further below, the client 12 and server 14 may be considered local in that they may share a common memory region or they may be considered remote in that they do not share a memory region. The bounding boxes in FIG. 1 at references 12 and 14 are then understood to represent a single memory region, and the space therebetween is understood to indicate that the client 12 and server 14 are therefore remote.

It will be understood that both the client 12 and server 14 may be local or remote within the same system; may be provided in separate systems that may be local by sharing the common memory region; or may be remote by having their own dedicated and non-shared memory region. As is typically understood then, local client 12 and server 14 communications are often within the same system or in the same hardware platform while remote client 12 and server 14 communications are between separate systems and/or separate hardware platforms; however, both local and remote systems may be within the same overall system or may be separate depending on the desired implementation.

In providing calls in a CORBA-based communication system, such as system 10, the CORBA protocols are able to recognize whether a remote procedure call (RPC) request (referred to herein simply as a "call") is a local call or a remote call, as discussed further below. When the CORBA protocol determines that a call is local, i.e. the client 12 calling the server 14 have a shared or common memory region, CORBA merely sends the call request and then takes no further action or steps in transmitting the data message. Accordingly, as discussed herein, the remainder of this disclosure it will be generally addressed to remote CORBA communications unless specifically stated otherwise. It will be further understood, however, that the CORBA jumper described and discussed further herein may be adapted for use with local calls as dictated by the desired implementation.

With continued reference to FIG. 1, the normal system 10 client 12 may be connected to a uses port shown at reference 16, which may be a communication endpoint provided on the client 12 side, and which may originate or generate an object/call request. The call request may be packaged and marshalled into a CDR where it may be unpacked and delivered to the server 14 provides port 18 for further processing on the server side.

Figure 2:
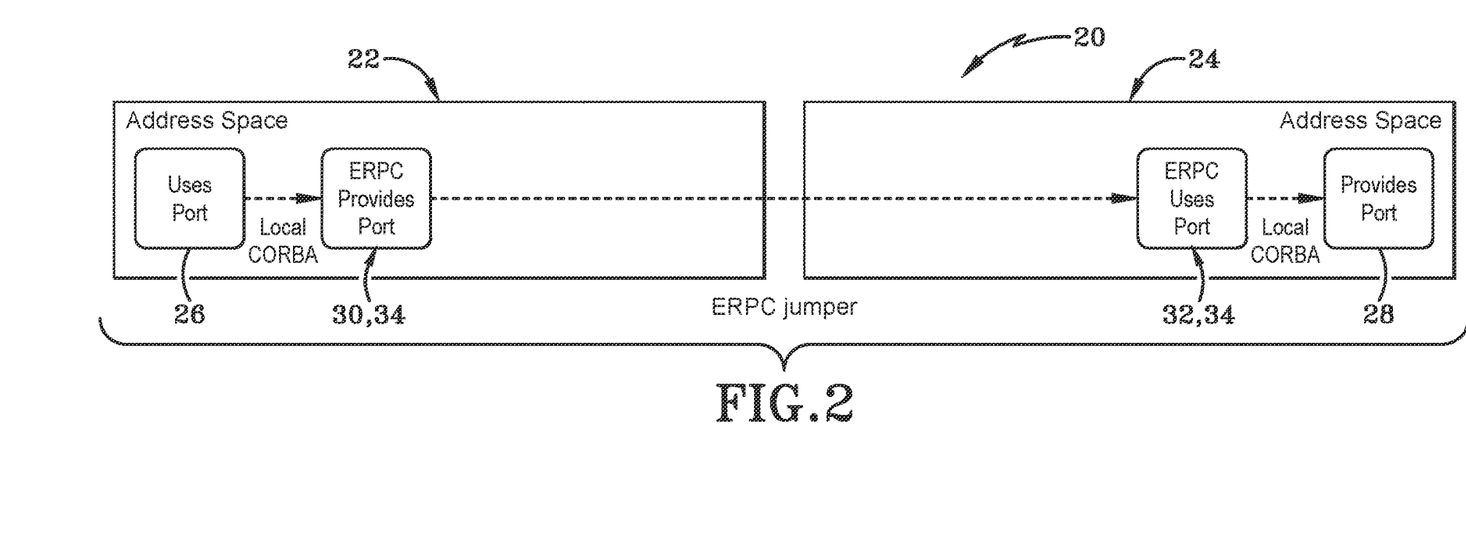
FIG. 2 (FIG. 2) is a block diagram representation of a CORBA call utilizing a custom transport jumper according to one aspect of the present disclosure.

With reference now to FIG. 2, a modified SCA CORBA port connection is shown and generally indicated as modified CORBA system 20. The modified SCA CORBA system 20 may be substantially identical to the normal SCA CORBA system 10 in that it may include a client 22 and a CORBA server 24 and may further utilize a uses port 26 on the client 22 side and a provides port 28 on the server 24 side. As with system 10, FIG. 2 shows a remote call in that client 22 is bounded into a single shared memory region separate from the server 24 side memory region (again indicated by the bounding boxes shown therein). Modified SCA CORBA system 20 may differ from CORBA system 10 in that the modified system 20 may include a client side embedded remote procedure call (ERPC) provides port 30 and a server side ERPC uses port 32. Together, the ERPC provides port 30 and uses port 32 collectively provide and are referred to as the ERPC jumper 34, described further below.

ERPC provides port 30 may be an IDL jumper, which may intercept the CORBA call on the client side 22 before the call request is transmitted to the server side. As discussed further below, this interception of the data message appears to the CORBA communication system to be a local call regardless of the local or remote status of the server 24 relative to the client 22 as discussed further below.

Modified system 20 is contemplated as an embedded system having at least one processor, memory, input and/or output devices, and at least one non-transitory storage medium integrated with or otherwise in communication therewith. It will be understood, however, that modified system 20 (as well as system 10, and systems 36 and 52 discussed below) may likewise be embedded systems. These integrated components may further be or include any suitable hardware and/or other elements for the normal and expected operation thereof. Further, these embedded systems are contemplated for use in any suitable computer based systems utilizing CORBA communications and/or remote call procedures, as described herein.

Figure 3:
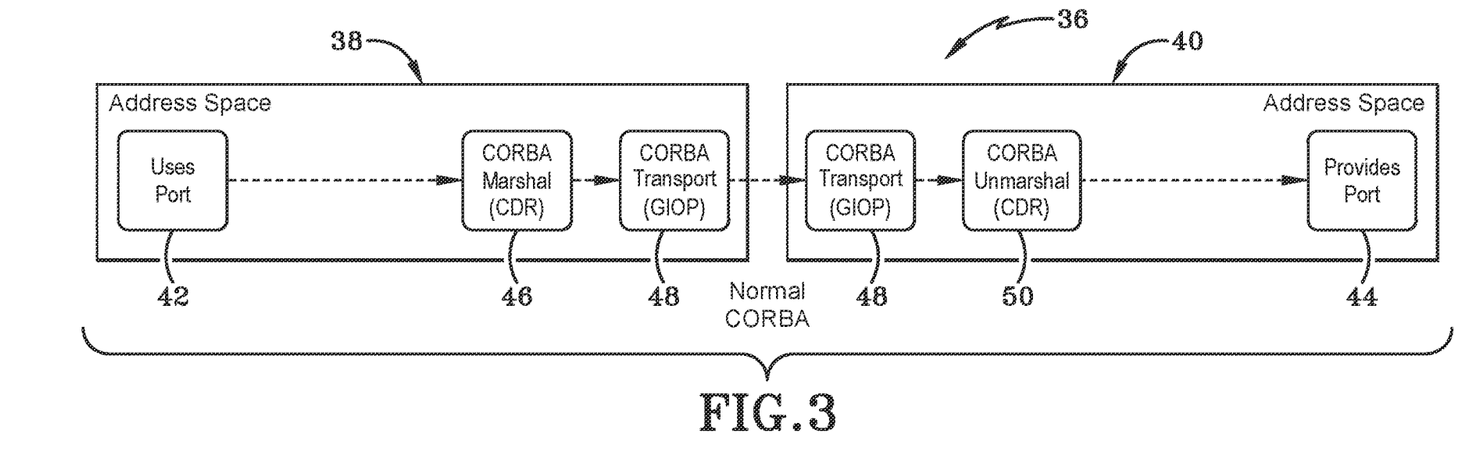
FIG. 3 (FIG. 3) is a block diagram representation of the remote CORBA call without use of a custom transport jumper from FIG. 1 shown in more detail according to one aspect of the present disclosure.

With reference to FIG. 3, to further break down the architecture, a "normal" remote CORBA system (similar to the call illustrated in FIG. 1) is shown and generally indicated at reference 36. This remote CORBA system 36 may likewise have a client 38 utilizing a client uses port 42 and a server 40 with a server provides port 44. As with prior systems 10 and 20, system 36 is depicted as a remote system with both the client 38 and server 40 bound within separate memory regions. As discussed further below with regards to the operation thereof, a call request may be generally sent from the client 38 uses port 42 to the server 40 provides port 44. Once the call is sent from the client 38 uses port 42, standard CORBA protocol is to marshal the call data into a CDR, shown at reference 46, before packaging it into a CORBA transport 48 and sending the call request to the remote server 40 where the transport 48 may be received and unmarshalled, shown at reference 50, before the call data is delivered to the server 40 provides port 44.

As mentioned previously herein, the marshalling 46 of call data into the CDR may allow for communications across dissimilar systems, this data marshalling introduces a substantial amount of overhead into the CDR, which in turn, causes the CORBA communications to have a reduced efficiency and increased security risk.

The CORBA transport 48 may be a General Inter-Orb Protocol (GIOP) messaging platform by which an object request broker (ORB) may communicate within a CORBA system. These ORBs may handle the communication marshalling and unmarshalling of call perimeters so that the perimeter handling is transparent for both the server 40 and client side 38 applications utilizing the call data.

Figure 4:
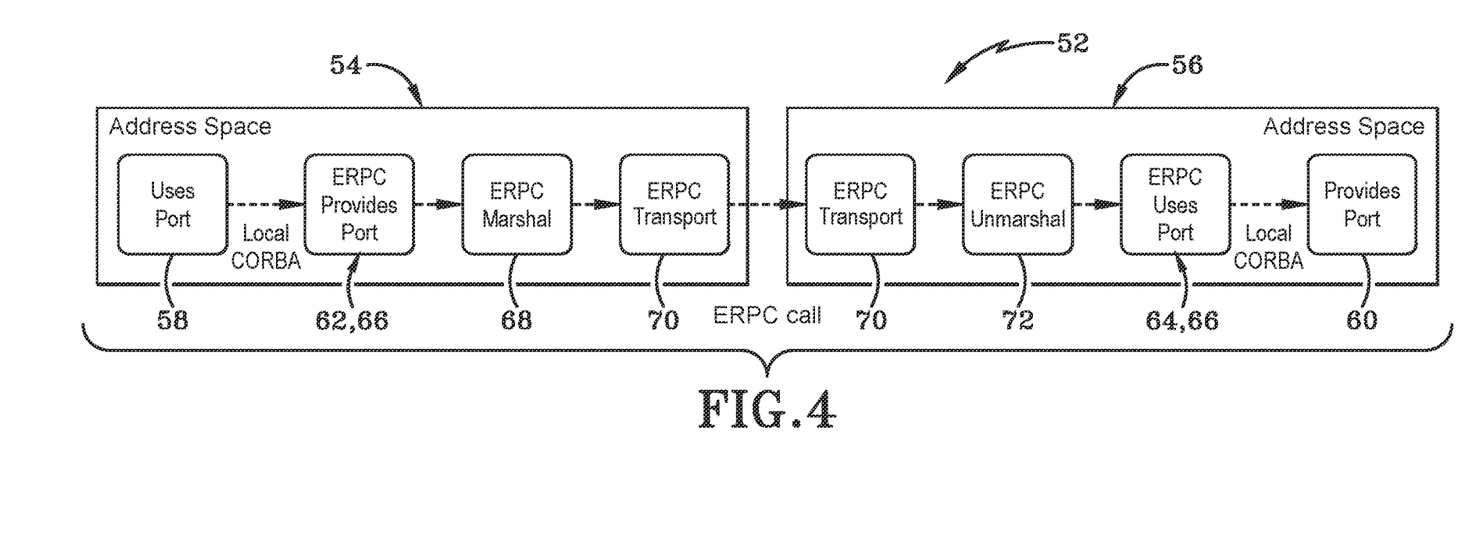
FIG. 4 (FIG. 4) is a block diagram representation of the remote CORBA call utilizing a custom transport jumper from FIG. 2 shown in more detail according to one aspect of the present disclosure.

With reference to FIG. 4, a modified remote call system utilizing the embedded remote procedure call (ERPC) jumper for CORBA communications, similar to the call illustrated in FIG. 2, is shown and generally represented as system 52. As with system 36 depicted in FIG. 3, the modified ERPC system 52 shown in FIG. 4 may include a client 54 and remote server 56 having a client uses port 58 and a server provides port 60, respectively. ERPC system 52 may further include an ERPC provides port 62 on the client 54 side and an ERPC uses port 64 on the server 56 side. Together, the ERPC provides port 62 and uses port 64 may collectively define the ERPC jumper 66, which again is discussed further below. Call requests sent through the ERPC jumper 66 may include ERPC-based marshalling, shown at reference 68, and an ERPC transport 70. Transport 70 may further provide data to an ERPC unmarshalling unit shown at reference 72 before the data is then further passed on to the server 56 provides port 60.

Both the ERPC jumper 34 (FIG. 2) and ERPC jumper 66 (FIG. 4) may best be understood through discussion of the use and operation thereof, which will now be described in more detail.

With reference to FIGS. 1 and 2, the general operation and method of use when utilizing an ERPC jumper 34 within an SCA framework will now be discussed with comparison to a "normal" SCA framework CORBA communications call of FIG. 1 versus the ERPC jumper 34 SCA call depicted in FIG. 2.

Accordingly, with continued reference to FIGS. 1 and 2, a basic SCA CORBA call utilizing ERPC jumper 34, or more particularly, the ERPC provides port 30 on the client 22 side and ERPC uses port 32 on the server 24 side, may allow the modified SCA system 20 to intercept a CORBA-based object request to appear to a CORBA implemented system as a local call. Specifically, the uses port 26 on the client 22 side may generate an object request (object/call requests are generally indicated by the arrows shown in the figures) utilizing an ORB, which may constitute sending data out from the uses port 26. ERPC provides port 30 may then receive this object request. As ERPC provides port 30 may be incorporated into the client 22 side of system 20 and share a memory region with the client 22 uses port 26, CORBA protocol views this as a local call. Put another way, as the ERPC provides port 30 and the uses port 26 have a shared memory region, CORBA protocol is not implemented as the object request remains within the same shared memory region.

The ERPC provides port 30 may then generally pass the object request onto the server where it may be received by the ERPC uses port 32. Similar to the client side 22, the ERPC uses port 32 and the server 24 provides port 28 are within the same shared memory region of the server 24. Therefore, when the data passes to the server 24 provides port 28, the CORBA protocol views this data as originating within the same memory region, and thus views this as an incoming local call.

Accordingly, the ERPC jumper 34 utilizing ERPC provides port 30 and ERPC uses port 32 allows for a more efficient data transfer that may be controlled or otherwise overseen by the ERPC jumper 34. In particular, once the ERPC provides port 30 receives the call from uses port 26, it has complete control over the object request and may service the request in a more secure and more efficient fashion than remote CORBA for an embedded system. This is further illustrated below in reference to the process for sending an RPC.

Accordingly, as compared to a normal SCA CORBA call illustrated in the FIG. 1, once the object request is sent from the uses port 16 in a normal SCA CORBA call it is under control of the CORBA system until received by the provides port 18, whereas in the modified SCA port system 20, the object request sent by uses port 26 is intercepted by ERPC jumper 34 within the local address space, i.e. the common memory region on the client 22 side, and may be controlled by the ERPC jumper 34 until received by the ERPC uses port 32 and transferred on to the CORBA provides port 28 on the server 24 side.

With reference now to FIG. 3 and FIG. 4, a more detailed further breakdown of the SCA CORBA and ERPC architectures may provide the added marshalling and transport functionality of a CORBA call. As seen in FIG. 3, in a normal remote CORBA call, when an object request (again, as illustrated by the arrows shown in FIGS. 3 and 4) is generated and sent out from the client 38 uses port 42, the CORBA marshalling of the object request data into a CDR is performed (shown as CORBA Marshal CDR module at reference 46 and referred to herein as CDR module 46) and packaged into a CORBA transport 48, which may deliver the message to the server side 40.

Commonly, the CORBA transport 48 is again a GIOP message, which normally contains data that is unnecessary and/or superfluous when used in conjunction with embedded systems. While CORBA further allows custom transports and custom transport layers to be introduced, these transports are not able to be introduced until after the CORBA marshalling into the CDR format occurs. Thus, a custom transport cannot be utilized to override the CORBA marshalling into the CDR format.

Once the transport 48 arrives at the server 40 in CORBA system 36, the CORBA protocol will first unmarshal the GIOP transport 48 message from the CDR module 46 and into the format utilized on the server 40 side, and may then deliver the object request data to the CORBA provides port 44. The CORBA unmarshalling module is shown at reference 50.

Contrast this with the ERPC modified CORBA call system 52, shown in FIG. 4, wherein ERPC jumper 66 is utilized having the ERPC provides port 62 on the client 54 side and the ERPC uses port 64 on the server 56 side. Specifically, when CORBA uses port 58 generates and sends an object request the ERPC provides port 62 of ERPC jumper 66 may intercept the object request. As with the basic framework breakdown, this call remains within the client side memory region and appears to the CORBA protocol as a local CORBA call wherein the CORBA marshalling into the CDR and CORBA transports are no longer initiated. Instead, ERPC jumper 66 may perform its own marshalling function (shown as ERPC marshal module 68) and may further provide its own transport 70. Transport 70 may direct the object request to the server 56 where it may be unmarshalled by ERPC unmarshal module 72 and delivered to the ERPC uses port 64. Every step from the interception of the call request by ERPC provides port 62 through the unmarshalling of the data by ERPC unmarshal module 72 may be handled by the ERPC jumper 66.

Once unmarshalled by the ERPC module 72 and sent to the ERPC provides port 62, the data associated with the object request may be directed to the CORBA provides port 60 for normal application and/or processing. As with the client 54 side, the server 56 side provides port 60, being in a common memory region with ERPC uses port 64, views this transaction as a local CORBA call and again does not implement any marshalling/unmarshalling and/or CORBA-based transporting of the object request data.

While the ERPC jumpers 34 and/or 66 introduce an additional step in the client calling process, basically amounting to an additional function call during the RPC process, the ERPC jumpers 34 and/or 66 within an embedded system may provide more efficient and more secure marshalling and transport than what can be done with CORBA-based embedded remote call systems.

Figure 5:
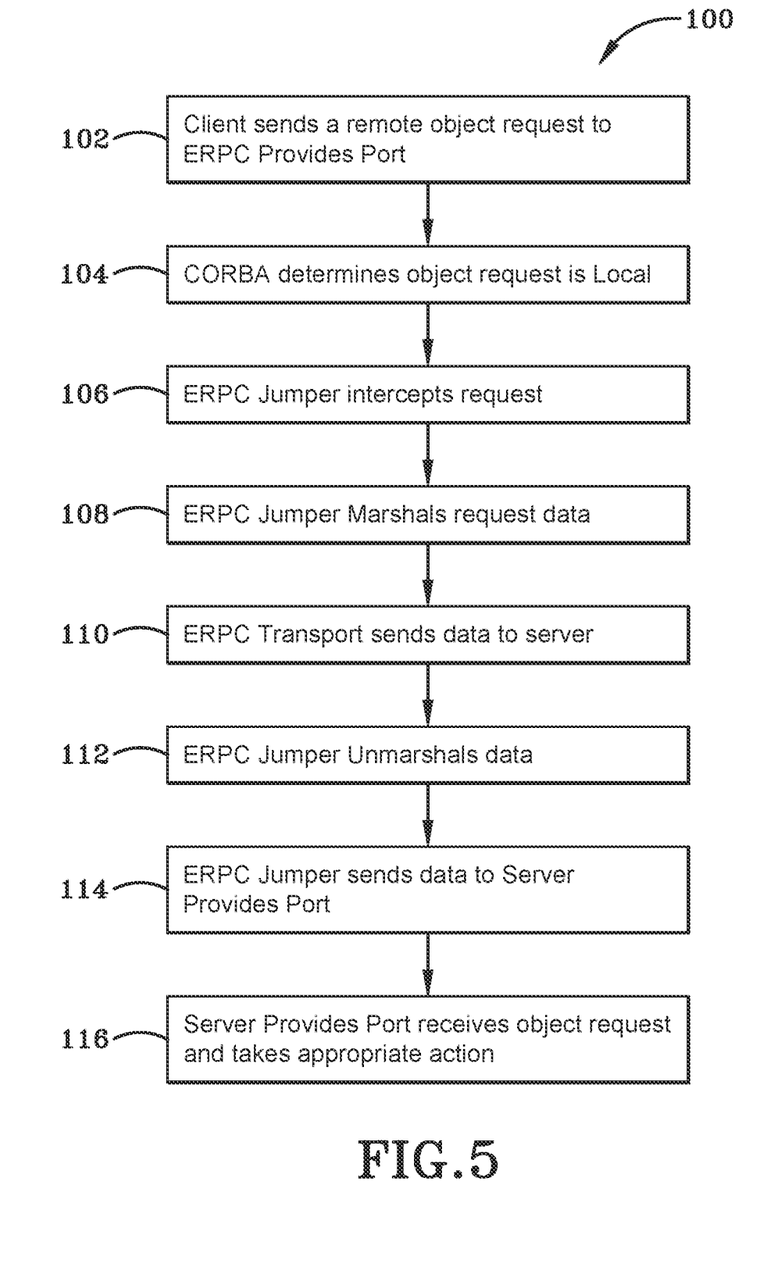
FIG. 5 (FIG. 5) is a flowchart representing a method of placing and receiving a CORBA based remote call utilizing a custom transport jumper according to one aspect of the present disclosure.

With reference now to FIG. 5, an exemplary flowchart is provided depicting an exemplary method of sending a remote client call utilizing an ERPC jumper. In particular, the process, shown at reference 100, relates to a generalized CORBA call utilizing ERPC jumper 66 (most closely associated with FIG. 4); however, it will be understood that process 100 may be adapted or modified for use with CORBA jumper 34, or with any other similar or suitable communications protocol, as desired or dictated by the desired implementation.

Accordingly, process 100 may begin when the client 54 sends a remote call (i.e. an object request) from the uses port 58 to the ERPC provides port 62. This is shown at reference 102 in process 100. Once the remote call is sent, because the uses port 58 and ERPC provides port 62 reside within the same client 54 memory region, the CORBA protocol will view this as a local call request and will not "intervene" into the object request. The local call determination by the CORBA protocol is shown at reference 104 in process 100.

At this point, as the ERPC provides port 62 receives the object request, causing the ERPC jumper 66 to intercept the call request to further prevent CORBA protocols from intervening. The interception of the call is shown at reference 106.

Once received by the ERPC provides port 62 and intercepted by jumper 66, the ERPC jumper 66 has complete control over the object request call and may then marshal the call data and transport the call data to the server 56. The ERPC marshalling of the call data is shown at reference 108 and the transportation of that data to the server 56 is shown at reference 110.

One the data reaches the server 56 side, the ERPC jumper 66 may unmarshal the call request using ERPC unmarshal module 72 so the data may be sent to the ERPC uses port 64.

The unmarshalling of the data by the ERPC unmarshal module 72 and sending of the data to the ERPC uses port 64 is shown at reference 112 in process 100.

Once the data is unmarshalled, ERPC jumper 66 may further direct that data on through the ERPC uses port 64 to the server 56 provides port 60. This is shown at reference 114 in process 100. Again, as with the original object request, this data appears to the CORBA protocol as originating within the same memory region as the server 56 provides port and therefore appears to the CORBA system as a local call. Thus, the server 56 provides port 60 may receive the data and take appropriate action according to the specific data contained within the object request. The reception of data and further action taken by the server 56 provides port 60 is indicated at reference 116 in process 100.

Although described generally herein, it will be understood that the ERPC jumpers 34 and/or 66 may be implemented into embedded communications systems and may be portable across all hardware platforms. The jumpers 34 and/or 66 may be software-based applications, which may allow use with multiple operating systems and multiple hardware platforms including for providing communications between systems utilizing differing operating systems and/or hardware configurations.

It is further contemplated that the ERPC jumpers 34 and/or 66 may be utilized with any POSIX-compliant system; however, it will be further understood that the ERPC jumpers 34 and/or 66 may be implemented on any suitable system operating with CORBA and/or SCA/CORBA framework.

Given the flexibility of the ERPC jumpers 34 and/or 66 and the ease of implementation across multiple hardware platforms and/or with multiple operating systems, it is contemplated that the ERPC jumpers 34 and/or 66 may be operable with any or all suitable legacy systems with little or no physical modifications thereto. Although the ERPC jumper described herein may be implemented on legacy systems and/or run with existing hardware, the utilization of the ERPC jumper may provide additional benefits in network communications otherwise unrealized in existing CORBA based communications systems and/or systems otherwise utilizing CORBA framework.

The benefits of utilizing ERPC jumper in an embedded system may be realized in the speed and efficiency in which communications may be transmitted between client and server systems as well as the ability to exercise proprietary security and control over the messages. Thus, CORBA communications utilizing ERPC jumpers 34 and/or 66 may be versatile and may continue to allow network communications between systems with varying operating systems and/or hardware profiles while further providing additional security, control, and efficiency over the data contents itself. Although the ERPC jumper described herein may be implemented on Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of network communications comprising:
generating a Common Object Request Broker Architecture framework based remote procedure call (RPC) request from a client;
intercepting the RPC request with an embedded remote procedure call (ERPC) jumper; and
directing data in the RPC request from the client to a remote server via an ERPC transport;
wherein the RPC request is intercepted from the client before the data therein is marshalled by the Common Object Request Broker Architecture framework.

2. The method of claim 1 further comprising:
receiving the data in the RPC request from the ERPC jumper at the remote server; and
directing the data in the RPC request from the ERPC jumper to the remote server.

3. The method of claim 2 further comprising:
marshalling the data in the RPC request with the ERPC jumper prior to directing the data via the ERPC transport.

4. The method of claim 3 further comprising:
unmarshalling the data in the RPC request with the ERPC jumper prior to directing the data in the RPC request from the ERPC jumper to the server.

5. The method of claim 1 wherein intercepting the RPC request further comprises:
sending the RPC from a client uses port; and
receiving the RPC request with an ERPC provides port within a shared memory region as the client uses port.

6. The method of claim 5 wherein receiving the RPC request with an ERPC provides port within a shared memory region as the client uses port appears as a local Common Object Request Broker Architecture based RPC request.

7. The method of claim 6 wherein directing the data from the ERPC jumper to the server further comprises:
sending the RPC from an ERPC uses port; and
receiving the RPC request with a server provides port within a shared memory region as the ERPC uses port.

8. The method of claim 7 wherein receiving the RPC request with a server provides port within a shared memory region as the ERPC uses port appears as a local Common Object Request Broker Architecture based RPC request.

9. The method of claim 1 wherein generating a Common Object Request Broker Architecture framework based RPC request further comprises:
generating a software communications architecture Common Object Request Broker Architecture framework based RPC request.

10. A non-transitory computer readable storage medium having instructions encoded thereon, that when executed by at least one processor, implement operations to intercept a remote procedure call (RPC) in a Common Object Request Broker Architecture framework system, the instructions including:
generate a Common Object Request Broker Architecture framework based remote procedure call (RPC) request from a client;
intercept the RPC request with an embedded remote procedure call (ERPC) jumper before the data therein is marshalled by the Common Object Request Broker Architecture framework; and
direct the data in the RPC request from the ERPC jumper to the remote server.

11. The non-transitory computer readable storage medium of claim 10 wherein the instructions further comprise:
receive the data in the RPC request from the ERPC jumper at the remote server; and
direct the data in the RPC request from the ERPC jumper to the remote server.

12. The non-transitory computer readable storage medium of claim 11 wherein the instructions further comprise:
marshal the data in the RPC request with the ERPC jumper prior to directing the data via the ERPC transport.

13. The non-transitory computer readable storage medium of claim 12 wherein the instructions further comprise:
unmarshall the data in the RPC request with the ERPC jumper prior to directing the data in the RPC request from the ERPC jumper to the server.

14. The non-transitory computer readable storage medium of claim 10 wherein intercepting the RPC request further comprises:
sending the RPC from a client uses port; and
receiving the RPC request with an ERPC provides port within a shared memory region as the client uses port.

15. The non-transitory computer readable storage medium of claim 14 wherein receiving the RPC request with an ERPC provides port within a shared memory region as the client uses port appears as a local CORBA based RPC request.

16. The non-transitory computer readable storage medium of claim 15 wherein directing the data from the ERPC jumper to the server further comprises:
sending the RPC from an ERPC uses port; and
receiving the RPC request with a server provides port within a shared memory region as the ERPC uses port.

17. The non-transitory computer readable storage medium of claim 16 wherein receiving the RPC request with a server provides port within a shared memory region as the ERPC uses port appears as a local CORBA based RPC request.

18. The non-transitory computer readable storage medium of claim 10 wherein generating a Common Object Request Broker Architecture framework based RPC request further comprises:
generating a software communications architecture Common Object Request Broker Architecture framework based RPC request.

\* \* \* \* \*